United States Patent

Nam et al.

[11] Patent Number: 5,905,710
[45] Date of Patent: May 18, 1999

[54] METHOD FOR CONTROLLING A RE-EMISSION INTERVAL IN AN ASYNCHRONOUS TRANSFER MODE INTERVAL CONTROLLER

[75] Inventors: Yoon Seok Nam; Sung Rae Cho; Jung Sik Kim, all of Daejeon, Rep. of Korea

[73] Assignees: Electronics and Telecommunications Research Institute, Daeieon; Korea Telecommunication Authority, Seoul, both of Rep. of Korea

[21] Appl. No.: 08/754,086

[22] Filed: Nov. 20, 1996

[30] Foreign Application Priority Data

Dec. 22, 1995 [KR] Rep. of Korea ...................... 95-54013

[51] Int. Cl.$^6$ .............................. H04J 1/16; H04L 12/28
[52] U.S. Cl. ........................................... 370/231; 370/395
[58] Field of Search .................................... 370/231, 232, 370/233, 412, 230, 418, 395, 392, 393, 414, 235, 239, 229, 253, 428, 429

[56] References Cited

U.S. PATENT DOCUMENTS

| | | | |
|---|---|---|---|
| 5,517,495 | 5/1996 | Lund et al. | 370/414 |
| 5,602,830 | 2/1997 | Fichou et al. | 370/232 |
| 5,617,416 | 4/1997 | Damien | 370/416 |
| 5,640,389 | 6/1997 | Masaki et al. | 370/418 |
| 5,689,508 | 11/1997 | Lyles | 370/391 |
| 5,724,353 | 3/1998 | Sugawara | 370/391 |

OTHER PUBLICATIONS

The Spacing Policer, An Algorithm for Efficient Peak Bit Rate Control in ATM Networks; Eugen Wallmeier and Tom Worster; 1992; pp. 22–26.

The Spacer Controller: An Efficient UPC/NPC for ATM Networks; Pierre E. Boyer, Michel J. Servel, Fabrice P. Guillemin; 1992; pp. 316–320.

Policing and Spacing of Multiplexed ATM Traffic; Hong–Shik Park and Jae–Kyoon Kim; 1994; pp. 1122–1132.

*Primary Examiner*—Ajit Patel
*Assistant Examiner*—Chiho Andrew Lee
*Attorney, Agent, or Firm*—Antonelli, Terry, Stout & Kraus, LLP

[57] ABSTRACT

The present invention relates to a method of controlling a re-emission interval of an asynchronous transfer mode interval controller using a theoretical departure time. The present invention controls the generation of CDV in a controller of the current RDT similarly to the existing RDT method for controlling the intervals of ATM cells by processing the time which a cell is outputted from an interval controller as a theoretical departure time and registering by a little earlier time in CSQ compensating for the queuing delay of OQ, and solves the problem of the queuing delay accumulation in the existing RDT method.

3 Claims, 4 Drawing Sheets

METHOD FOR CONTROLLING A RE-EMISSION INTERVAL IN AN ASYNCHRONOUS TRANSFER MODE INTERVAL CONTROLLER

BACKGROUND OF THE INVENTION

1. Field of the Invention

The present invention generally relates to a method of controlling a re-emission interval of an asynchronous transfer mode interval controller and, more particularly, a method of controlling a re-emission interval using a theoretical departure time.

2. Description of the Prior Art

Generally, in developing public telecommunication network, a user requires gradually increased speed, a wideband, and multiple functions, and increased intelligence regarding service such as multimedia, etc. Today, B-ISDN has been developed for wide band communication. Since international standard organization such as ITU-T and ATM-Forum have recommended ATM as a wide band communication mode, an ATM switching system is being devloped.

However, traffic control is essential in using an ATM system because the user information therein is transferred in an ATM cell and an asynchronous method is utilized. To maintain the quality of service for the connected calls, there is call admission control for determining whether a new call is accepted, priority control for recognizing a sensibility degree for transfer delay and cell loss among various kinds of cells and preferentially transferring and discarding calls, congestion control for controlling flow so that a blocking state is not maintained for a long time when congestion occurs and for preventing congestion in network node, Usage Parameter Control(UPC)/Network Parameter Control (NPC) for protecting a network source by monitoring a traffic characteristic agreed upon between a user and a network and discarding a cell when the agreement is violated, and a cell interval control for efficiently using the network resource by controlling cell interval and equalizing burst traffic.

There are conventional cell interval control methods such as an Arrival Re-emission Time(ART) method based on the input time in an interval controller, and a Recent Departure Time(RTD) method based on the output time from an interval controller.

The ART method described above have a simple buffer control dealing with multiplexing in an interval controller but having an effect on a multiplexed cell stream in output traffic by taking the input state into consideration without taking output state from the interval controller into consideration. Delay which is generated between every cell varies because of the multiplexing of the interval controller, as indicated by cell delay variation(CDV). Accordingly, in an ART mode, there is declined performance of an interval control function due to the multiplexing of the interval controller. The multiplexing output cell stream in the interval controller is affected by the utilization of link and, consequently in the context of network resource management, stable interval control is difficult. On the other hand, the Recent Departure Time(RDT) method performs control based on the output time of the interval controller. By including CDV generated from the interval controller, it is possible to control a distinctive cell interval. However, in RDT method, when counting the expectation departure time, the actual departure time of the previous cell is used at the interval controller. After this registered cell with the scheduled departure time has a little queuing delay, it departs from the interval controller later than the scheduled time. As such the departure time is used for determining the scheduled departure time of the next input cell, the queuing delay is accumulated according to sequential cell processing. Therefore, this requires theoretically unlimited buffers.

Accordingly, the present invention suggests a method of controlling a cell interval in order to reduce delay from the interval controller, which has stable characteristics for the connecting number and the utilization of a link and is unsensitive to CDV by applying the advantage of RDT mode and compensating for the shortage thereof, and therefore uses a Theoretical Departure Time(TDT) for controlling the cell re-emission interval.

SUMMARY OF THE INVENTION

To solve problems described above, it is an object of the present invention to provide a method for controlling a re-emission interval of an asynchronous transfer mode (ATM) interval controller which can be used in UPC, NPC, UPC/NPC etc. by using output time as the theoretical departure time for controlling the cell interval departing from an ATM cell interval controller.

One aspect of the present invention includes a method of controlling a re-emission interval of an asynchronous transfer mode interval controller, said controlling method comprising the following: a first step for checking whether the cell belonging to a same connection exists in a CSQ(Cell Slot Queue) or a OQ(Output Queue) when a cell is input; a second step for storing the cell in a TQ(Temporary queue) having the same connection if a cell exists in said first step, and computing an integrated expected departure time with reference to the integrated traffic of cell loss priority 0 and 1 if a cell does not exist in said first step; a third step for computing an expected departure time 0 if the cell loss priority bit is 0 after performing said second step, registering in said CSQ as an expected departure time the largest value among the integrated expecting departure time and the expecting departure time 0 and the current time, and registering in said CSQ as the expected departure time the expecting departure time 1 if the cell loss priority bit is 1; a fourth step for improving an integrated theoretical departure time with reference to an integrated traffic of cell loss priority 0 and 1 when one cell is output from said OQ, and improving a theoretical departure time 0 based on the traffic parameter of the cell priority 0 agreed upon between the user and network if a cell loss priority for a relevant cell is 0; a fifth step for examining whether a cell connected commonly to a relevant cell exists in said TQ after the improvement of the theoretical departure time is accomplished, after said fourth step; a sixth step for registering the first cell in said CSQ if there exists cells belonging to the same connection in said TQ after said fifth step; and a seventh step for finishing if there exists no cell belonging to the same connection in said TQ after said fifth step or just finishing after said sixth step.

BRIEF DESCRIPTION OF THE ATTACHED DRAWINGS

The present invention will now be described with reference to the drawings attached only by way of example.

DETAILED DESCRIPTION OF PREFERRED EMBODIMENT

Figure 1:
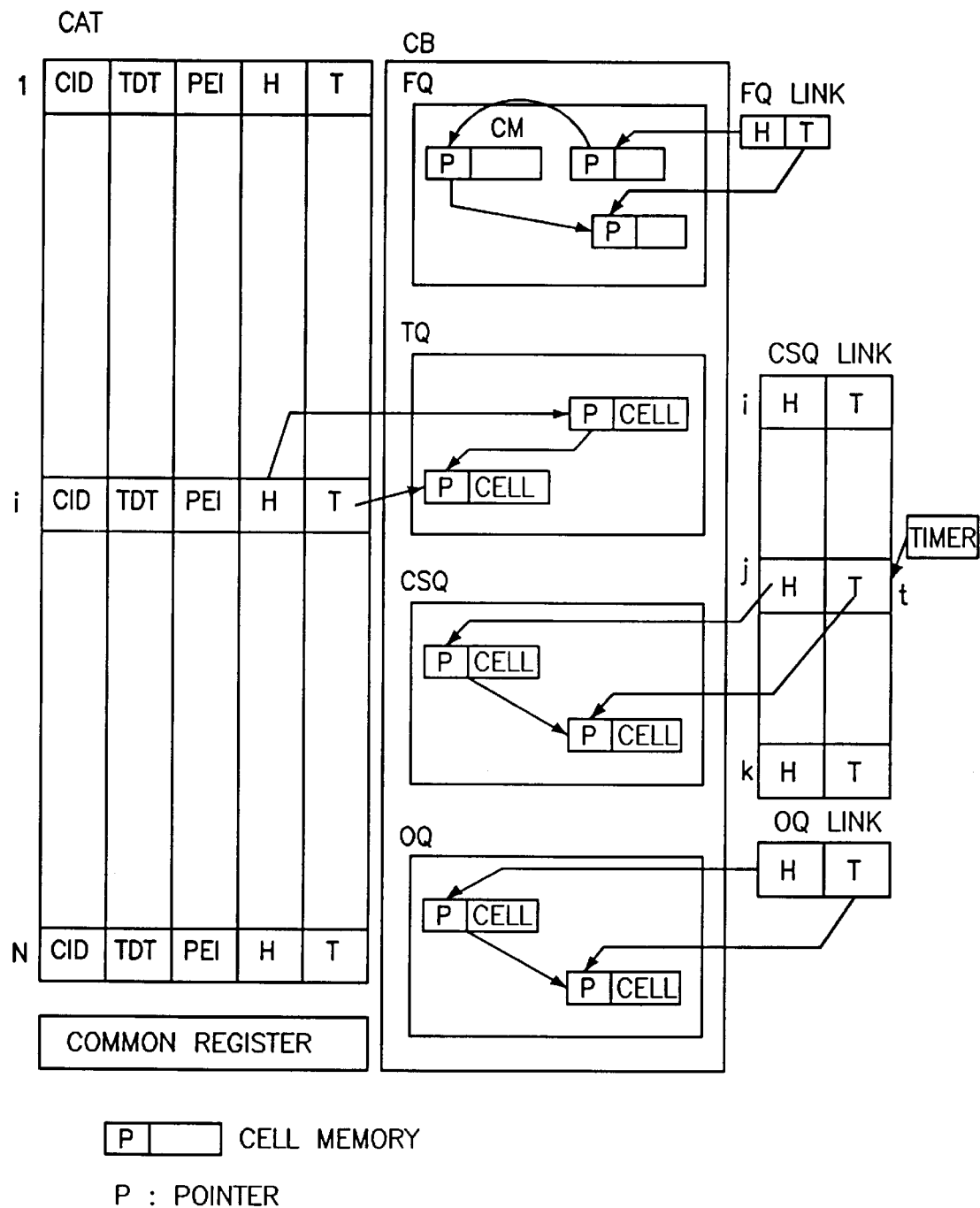
FIG. 1 is a construction view of a buffer applying the present invention.

FIG. 1 is a construction view of a buffer for controlling the cell interval of ATM cell in TDT mode. As shown in FIG. 1, there is shown a buffer construction similar with arrival re-emission time (ART) mode except common registers for storing $D_{oq}$ etc. compensating queuing delay of OQ(Output Queue), the difference between recent departure time (RDT) and theoretical departure time (TDT) is that RDT is stored instead of TDT in CAT(connection attribute table) for buffer construction, that is, basically, a re-emission interval control method. The CAT in the drawing is the table controlling the respective connection characteristic parameters, and the maximum connection number is N. CAT controls data in the respective connection parts, and is composed of CID (Connection Identification) identified by VPI/VCI, TDT (Theorectical Departure Time) anticipating the next cell output at the same time while outputting the most recent cell, a traffic parameter Peak Emission Interval (PEI) agreed upon between user and network at call setup, and pointers of head and tail of TQ(Temporary Queue). CB(Cell Buffer) storing cell is composed of four queues, including FQ(Free Queue), TQ, CSQ(Cell Slot Queue), and OQ. The respective queue control CM(Cell Memory) includes one ATM cell and a pointer in Linked-List. FQ is the queue for storing input cell and because it is empty it requires one head and tail, CSQ is the registered cell queue matching for anticipating output time and requires the maximum amount of cell delay variables that can be received which is the number of K heads and tails in FIG. 1, TQ is a temporary storing queue which is necessary because the anticipated output time is unknown since the previous input cell is not yet output and requires the same number of heads and tails as the number of connections. FIG. 1 shows the number of N heads and tails, OQ is the queue for sequentially outputting a cell at every cell time, and requires one head and tail. The timer controls the register and moves and deletes CM, and operates as the cell time.

For inputting a cell, first, storing a cell data in CM is indicated by the head of FQ, and the connection of input cell is then confirmed. If the same connection cell exists in CSQ and OQ, register the cell in TQ; if not, employ the formula (1) utilizing an expecting departure time(EDT) from $TDT_{n-1}$ which is time the previous cell departed, DOQ for compensating the queuing delay of OQ, the current time(t) of timer, and constant K of CSQ, and register the cell in $EDT_n$'th CSQ.

$$j = EDT_n = \max(TDT_{n-1} - D_{oq}, t) \bmod K \quad (1)$$

$$\max(X, Y) = \begin{cases} X \text{ if } X \geq Y \\ Y \text{ if } Y < X \end{cases}$$

That is, if the value subtracting the term compensating for the delay of OQ from the previous TDT is larger than the current time that the timer indicates, the cell is registered in CSQ for departure after a certain time. If the current time is larger, the cell is registered in the CSQ arrangement that the timer currently indicates.

The cell moving from CSQ to OQ is activated by the timer which is increasing at every cell time. All cells registered in the relevant CSQ indicated by the timer are registered to the tail of OQ.

The departure from OQ means that if there are cells in OQ, one cell departs from head of OQ at every cell time.

Theoretical departure time for the scheduled departure time that the next cell is output can be obtained by the following formula (2). That is, a new TDT in CAT is registered.

$$TDT_n = \max(TDT_{n-1}, t) + PEI \quad (2)$$

wherein $TDT_{n-1}$ is a previous Theoretical Departure Time, t is the current time, and PEI is the peak emission interval.

At this time, if there are cells belonging to the same connection of the cell departed from OQ in TQ, the first cell of the relevant TQ is counted by using the new TDT resulting from formula(2), registered in CSQ. If the cell from OQ is departed, CM used in the relevant cell data store is registered in FQ, which is the basic function of linked-list.

Figure 2:
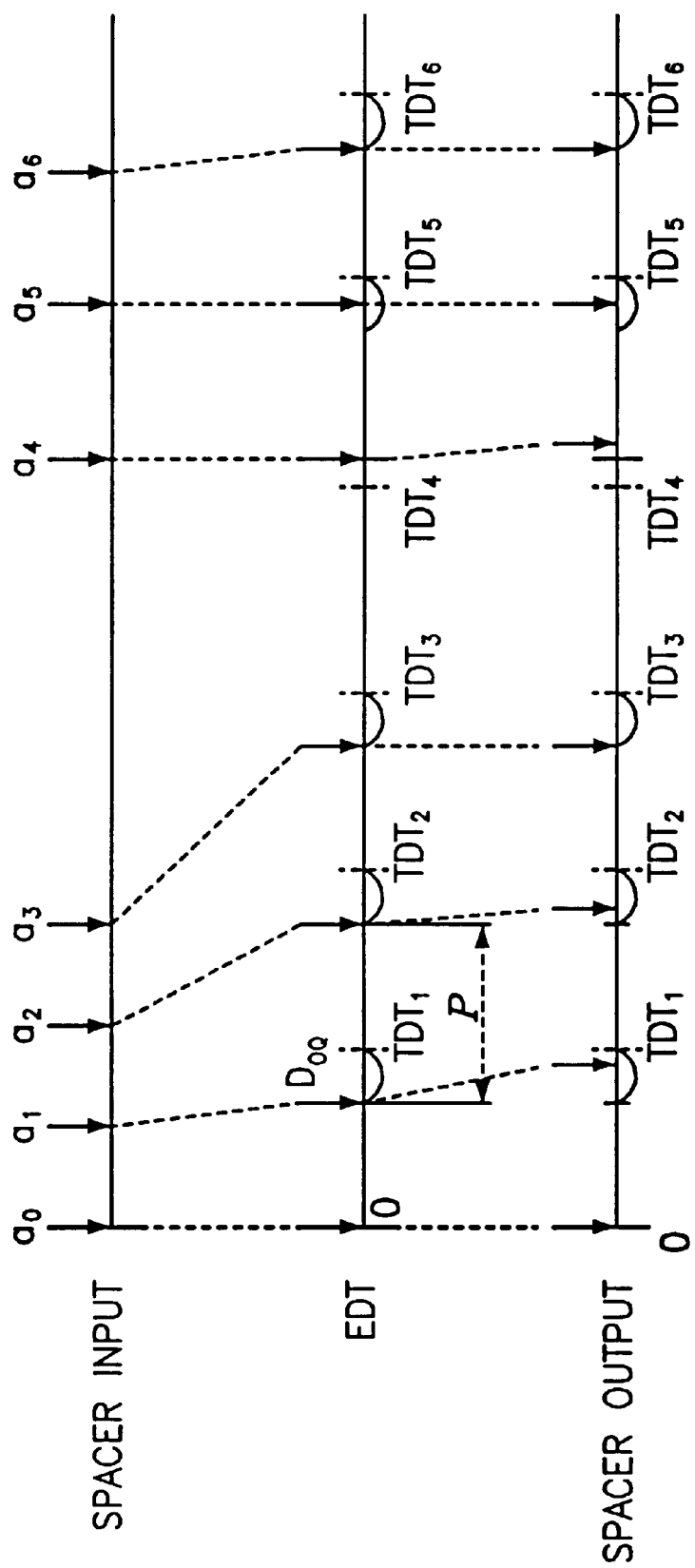
FIG. 2 is an embodying view of a cell process according to the present invention.

FIG. 2 is an embodying view showing a cell process of the present invention. In FIG. 2, $D_{oq}$ indicates the delay compensation of OQ, and P indicates the peak emission interval. When cells unpitied by an interval controller are dense, the value of EDT is determined by the queuing delay compensating term of OQ and the previous TDT. The real output time of such cells comes after a little delay from EDT. a1, a2, . . . in the drawing indicate input cells. EDT is obtained by formula (1). The interval controller departure shows that the delay from EDT can be generated in the interval controller. TDT is computed from the formula (2) when cells are output. In case of the dense cells, TDTs are larger than their current time. In case of cell $a_4$, the current time is larger than its TDT.

In examining the re-emission interval control mode of RDT so as to be distinguished TDT method from RDT method, when registering cells in CSQ, the expected departure time is determined by formula (3), and the difference of TDT and RDT is that the peak emission interval PEI is determined without considering the delay of OQ.

$$EDT_n = \max(RDT_{n-1} + PEI, t) \bmod K \quad (3)$$

If a cell departs from OQ, the time at the departure is improved by a new RDT. Accordingly, when examining the queuing delay from RDT mode, as the cell registered in CSQ departs and moves to OQ with the queuing delay, the improved RDT by which the cell departs from OQ is determined by formula (4).

$$RDT_n = EDT_n + d_n \quad (4)$$

wherein d indicates the queuing delay from OQ and is expressed by n=0,1,2, . . . The upper value is limited by the link utilization and the number of connections, in the embodiment of the present invention, there is mostly showed the delay of O and 1. It is verified that the large delay iB generated by the maximum value 6 remarkably reducing the frequency thereof. Arranging again the formula(3), it equals to the formula(5).

$$EDT_n = \max(RDT_{n-1} + PEI, t) \quad (5)$$

$$= RDT_{n-1} + PEI + (T - (RDT_{n-1} + PEI))^+$$

$$= RDT_{n-1} + PEI + \delta_{n-1}$$

wherein $\delta_n$ is a cell transfer delay by CDV, $\{\cdot\}^+$ $$\{X\}^+ = \{0, \text{if } x \leq 0 \text{ or } x, \text{if } x > 0\}$$

RDT is expressed as the formula (6) below, wherein T represents a peak emmission interval PEI for simple expression $$RDT_n = EDT_n + d_n = (RDT_{n-1} + T + \delta_{n-1}) + d_n \quad (6)$$

$$= (EDT_{n-1} + d_{n-1}) + T + \delta_{n-1} + d_n$$

$$= (RDT_{n-2} + T + \delta_{n-1}) + T + \delta_{n-1} + d_{n-1} + d_n$$

$$= (n-1)T + RDT_1 + \sum_{i=2}^{n-1} \delta_i + \sum_{i=2}^{n} d_i$$

wherein, $$\sum_{i=2}^{n-1} \delta_i \leq CDVmax$$

CDVmax indicates a maximum CDV. Thus, $RDT_n$ is expressed by the following formula(7).

$$RDT_n \leq (n-1)T + RDT_1 + CDVmax + \sum_{i=2}^{n} d_i \quad (7)$$

According to the formula(7), the queuing delay term is cumulated and has an effect on RDT. The queuing delay requires RDT method to have infinite buffers. This is an uncorrectable defect in RDT.

To eliminate the queuing delay term of the formula (7), the present invention registers CSQ earlier than a scheduled time and the improved value of time for output is used as the TDT (theoretical departure time) at OQ instead of the RDT to output at OQ.

Figure 3:
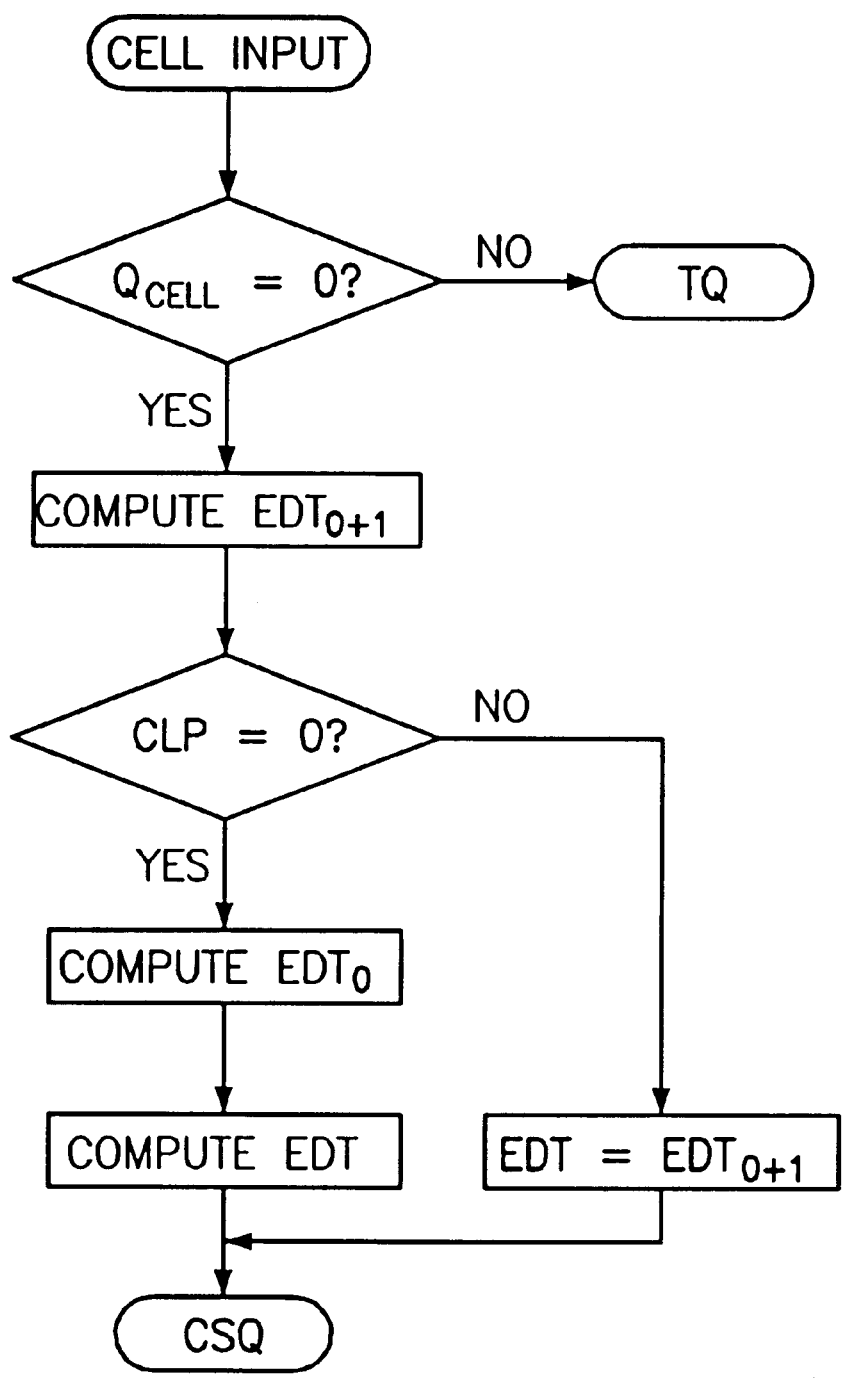
FIG. 3 is a process flow chart when inputting a cell according to the present invention.
Figure 4:
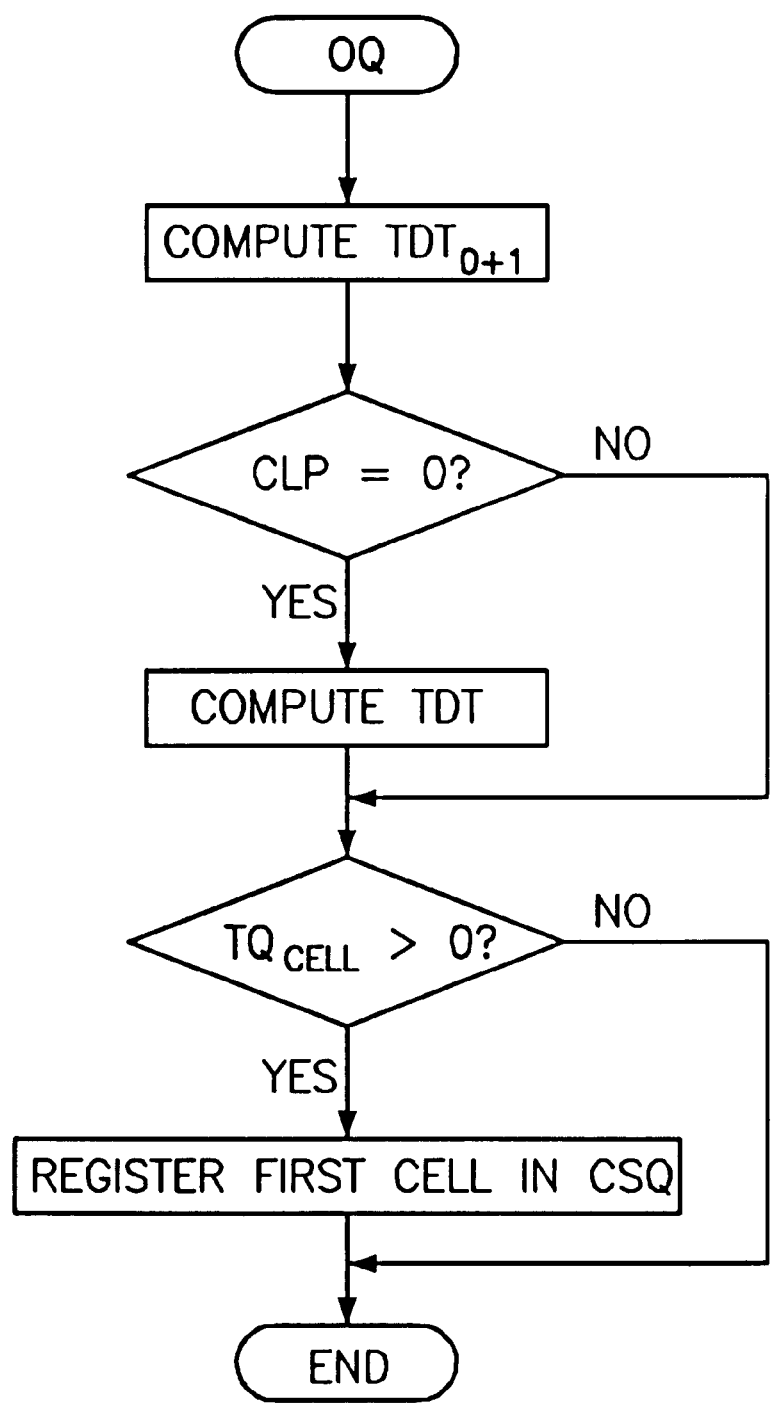
FIG. 4 is a process flow chart when outputting a cell according to the present invention.

When the method of the present invention is applied to a cell interval controller, the processes in a cell-input and a cell-output are illustrated in FIGS. 3 and 4, respectively. FIGS. 3 and 4 are all diagrams for the processes that CLP bit which is indicative of the cell-loss priority order in a header of ATM cell is divided.

Referring to FIG. 3, after a cell-input, it is decided whether another cell which belongs to the same connection exists in CSQ or OQ, and if so, the cell is stored in TQ of the same connection. Otherwise, if there is no cell, $EDT_{0+}$ for the CLP=0+1 traffic which is an integrated traffic of cells where CLP=0 or 1 is computed according to the formula (1). Then, if CLP=0 in the input-cell, $EDT_0$ for the CLP=0 traffic is calculated and EDT which is taken by the largest value among $EDT_{0+1}$, $EDT_0$ and a current time is registered in CSQ. IF CLP=1, EDT taken by $EDT_{0+1}$ is registered in CSQ.

Referring now to FIG. 4, when a cell is output from OQ, according to the formula(2), $TDT_{0+1}$ for the CPL=0+1 traffic is improved basis on CLP=0+1 which is the traffic parameter agreed upon between users and network. If CLP=0 in the relevant cell, $TDT_0$ is improved based on CLP=0 traffic parameter agreed upon between users and network. But if CLP=1, there occurs no improvement of $TDT_0$.

After TDT is completely improved as described above, whether there exists cell belonging to the same connection in TQ or not is determined, and, if so, the first cell is registered in CSQ according to the formula (1).

The above-described invention controls the generation of CDV in a controller of the current RDT similarly to the existing RDT method for controlling the intervals of ATM cells by processing the time which a cell is output from an interval controller as a theoretical departure time and registering a little earlier in CSQ to compensate for the queuing delay of OQ, and solves the problem of the queuing delay accumulation in the existing RDT method. Accordingly, the present invention provides an interval controller to control a cell interval by using the time output from the controller.

Although the present invention has been described above with reference to the preferred embodiments thereof, those skilled in the art will readily appreciate that various modifications and substitutions can be made thereto without departing from the spirit and scope of the invention as set forth in the appended claims.

What is claimed is:

1. A method of controlling a re-emission interval of an asynchronous transfer mode (ATM) interval controller, said controlling method comprising the steps of:

a first step for checking whether a second cell belonging to a same connection exists in CSQ(Cell Slot Queue) or OQ(Output Queue) when a first cell is input;

a second step for storing the first cell in a TQ (Temporary Queue) having the same connection if the second cell exists in said first step, and computing an integrated expected departure time with reference to the integrated traffic of cell loss priority 0 and 1 if the second cell does not exist in said first step;

a third step for computing an expected departure time 0 if the cell loss priority bit is 0 after performing said second step, registering, in said CSQ, as an expected departure time the largest value among the integrated expected departure time and the expected departure time 0 and the current time, and registering, in said CSQ, as the expected departure time the expected departure time 1 if the cell loss priority bit is 1;

a fourth step for improving an integrated theoretical departure time with reference to an integrated traffic of cell loss priority 0 and 1 when one cell is output from said OQ, and improving a theoretical departure time 0 based on the traffic parameter of the cell loss priority 0 agreed upon between a user and network if a cell loss priority for a relevant cell is 0;

a fifth step for examining whether a cell commonly connected to a relevant cell exists in said TQ after improvement of the theoretical departure time TDT is accomplished, after said fourth step;

a sixth step for registering the first cell in said CSQ if there exists cells belonging to the same connection in said TQ after said fifth step; and a seventh step for finishing when no cell exists belonging to the same connection in said TQ after said fifth step or after said sixth step.

2. A method of controlling a re-emission interval of an asynchronous transfer mode (ATM) interval controller, said controlling method comprising the steps of:

a first step for checking whether a second cell belonging to a same connection exists in CSQ (Cell Slot Queue) or Oq (Output Queue) when a first cell is input;

a second step for storing the first cell in a TQ (Temporary Queue) having the same connection if the second cell exists in said first step, and computing an integrated expected departure time with reference to the integrated traffic of cell loss priority 0 and 1 if the second cell does not exist in said first step;

a third step for computing an expected departure time 0 if the cell loss priority bit is 0 after performing said second step, registering, in said CSQ, as an expected departure time the largest value among the integrated expected departure time and the expected departure time 0 and the current time, and registering, in said CSA, as the expected departure time the expected departure time 1 if the cell loss priority bit is 1;

a fourth step for improving an integrated theoretical departure time with reference to an integrated traffic of cell loss priority 0 and 1 when one cell is output from said OQ, and improving a theoretical departure time 0 based on the traffic parameter of the cell loss priority 0 agreed upon between a user and network if a cell loss priority for a relevant cell is 0;

a fifth step for examining whether a cell commonly connected to a relevant cell exists in said TQ after improvement of the theoretical departure time TDT is accomplished, after said fourth step;

a sixth step for registering the first cell in said CSQ if there exists cells belonging to the same connection in said TQ after said fifth step; and a seventh step for finishing when no cell exists belonging to the same connection in said TQ after said fifth step or just finishing after said sixth step, wherein a delay of OQ is compensated so as to register said input cell in CSQ.

3. A method of controlling a re-emission interval of an asynchronous transfer mode (ATM) interval controller said controlling method comprising the steps of:

a first step for checking whether a second cell belonging to a same connection exists in CSQ (Cell Slot Queue) or OQ (Output Queue) when a first cell is input;

a second step for storing the first cell in a TQ (Temporary Queue) having the same connection if the second cell exists in said first step, and computing an integrated expected departure time with reference to the integrated traffic of cell loss priority 0 and 1 if the second cell does not exist in said first step;

a third step for computing an expected departure time 0 if the cell loss priority bit is 0 after performing said second step, registering, in said CSQ, as an expected departure time the largest value among the integrated expected departure time and the expected departure time 0 and the current time, and registering, in said CSQ, as the expected departure time the expected departure time 1 if the cell loss priority bit is 1;

a fourth step for improving an integrated theoretical departure time with reference to an integrated traffic of cell loss priority 0 and 1 when one cell is output from said OQ, and improving a theoretical departure time 0 based on the traffic parameter of the cell loss priority 0 agreed upon between a user and network if a cell loss priority for a relevant cell is 0;

a fifth step for examining whether a cell commonly connected to a relevant cell exists in said TQ after improvement of the theoretical departure time TDT is accomplished, after said fourth step;

a sixth step for registering the first cell in said CSQ if there exists cells belonging to the same connection in said TQ after said fifth step;

a seventh step for finishing when no cell exists belonging to the same connection in said TQ after said fifth step or just finishing after said sixth step;

registering in CSQ with an expected departure time computed from an improved theoretical departure time TDT subtracted by OQ delay compensation and a current time; and improving a theoretical departure time TDT and a current time and a peak emission interval PEI of a relevant connection to the output cell.

* * * * *